United States Patent [19]

Podell et al.

[11] 4,383,813

[45] May 17, 1983

[54] PASTA EXTRUDER APPARATUS

[75] Inventors: Allen F. Podell, Palo Alto; Richard S. Davis, San Francisco, both of Calif.

[73] Assignee: Cuisinarts, Inc., Greenwich, Conn.

[21] Appl. No.: 286,286

[22] Filed: Jul. 23, 1981

[51] Int. Cl.³ .............................. B29F 3/01; A21C 3/04
[52] U.S. Cl. .................................. 425/204; 425/376 R
[58] Field of Search .......................... 426/451, 514, 517; 222/131, 238, 271, 272; 425/464, 376 R, 204, 209; 264/40.7

[56] References Cited

U.S. PATENT DOCUMENTS

| | | | |
|---|---|---|---|
| 1,331,325 | 2/1920 | Doellinger | 425/376 R |
| 1,900,607 | 3/1933 | Kremmling | 425/376 R |
| 2,576,061 | 11/1951 | Ambrette | 425/376 R |
| 2,621,615 | 12/1952 | Lombardi | 426/451 |
| 4,171,193 | 10/1979 | Rahlfs | 264/40.7 |
| 4,336,213 | 6/1982 | Fox | 264/40.7 |

*Primary Examiner*—Willard E. Hoag
*Attorney, Agent, or Firm*—Parmelee, Bollinger & Bramblett

[57] ABSTRACT

A pasta extruder for forming strand-like pasta. The extruder housing has a feed hopper and gears for feeding the pasta mixture to be extruded into the apparatus. An extrusion die plate having a plurality of extrusion orifices is mounted in the housing adjacent to a pressure chamber and axially of said gears.

10 Claims, 3 Drawing Figures

PASTA EXTRUDER APPARATUS

BACKGROUND OF THE INVENTION

This invention relates to pasta extruder apparatus which may be used as a separate appliance or may be arranged to be driven as an attachment to an existing kitchen appliance, such as a food processor, for shaping articles of food from fresh-mixed dough or alimentary granules known as pasta to form such strand-like food items as spaghetti, vermicelli, noodles, ribbons, strings, etc. More particularly, the apparatus includes counter-rotating intermeshing gears which force the pasta out through an extrusion die in a compact, efficient arrangement.

Conventional prior pasta extruders employ a helical feed screw in an elongated tubular barrel, which pushes the pasta in a forward direction along the barrel toward an extrusion die located at the exit end of the barrel. Such helical feedscrew apparatus waste considerable power in the frictional heating of the pasta mixture, such frictional heating occurring as a result of slippage of the pasta dough along the inner surface of the barrel and slippage along the inclined flights of the feed-screw as well as by the churning of the pasta mixture produced by the feed-screw action. The feed-screw must of necessity be long and requires several turns of the screw flight to get enough "bite" to push the pasta mixture through an extrusion die. Accordingly, such apparatus is bulky, inefficient, expensive and requires a powerful drive motor, which wastes a considerable amount of electrical energy. Moreover, the end of the feedscrew flights near the extrusion die tends to scrape the pasta mixture through the die with a deleterious, intermittent scraping or wiping action as the end of each screw blade or blades scrape past the die. In distinction, the extruder apparatus of the present invention uniformly pressurizes the pasta mixture in a chamber adjacent to the die plate for substantially uniformly extruding the pasta through the various orifices in the die plate.

SUMMARY OF THE INVENTION

Accordingly, it is an object of this invention to provide a new and improved pasta extruder apparatus which is compact, efficient and attractive for home kitchen or restaurant use.

Among the advantages of this invention are those resulting from the fact that the apparatus generates a large pressure on the pasta dough mixture enabling the forcing of the mixture uniformly through an extrusion die plate having numerous orifices for simultaneously producing numerous uniform strand-like food articles.

In carrying out this invention in one illustrative embodiment thereof pasta extruder apparatus is provided having a housing with a feed hopper thereon for feeding a pasta mixture, dough or alimentary granules to be extruded into the apparatus. First and second gears mounted for rotation in the housing have peripheral spur or slightly helical cut teeth which intermesh in a meshing zone. This meshing zone is in communication with the hopper such that the pasta mixture is fed from the hopper into the spaces between the teeth of the gears and then is propelled by the gear teeth to the meshing zone between the two gears. The meshing teeth force the pasta mixture out of the spaces between the teeth under pressure into a pressure chamber adjacent to a die plate for substantially uniformly pressurizing the pasta mixture in the pressure chamber for forcing the pasta to extrude uniformly out through the orifices in a die plate.

Drive means are provided for rotating the first and second gears in opposite directions within the housing. In the case of a pasta extruder arranged to be used as an attachment for a kitchen appliance such as a food processor, the drive means comprise the drive for the appliance which is coupled to the gears in the extruder. An extrusion die plate having a plurality of orifices is mounted in the housing adjacent to the pressure chamber in communication with the meshing zone. The teeth of the gears, after transporting the pasta to the meshing zone, mesh for forcing the pasta out from between the teeth under pressure into the pressure chamber. The resultant substantially uniform pressure in the pressure chamber advantageously uniformly extrudes the pasta out through the multiple orifices in the extrusion die plate, thereby extruding and shaping the food items in accordance with the size and the shape of the orifices.

BRIEF DESCRIPTION OF THE DRAWINGS

The invention, together with further aspects, objects, features and advantages thereof may be best understood from a consideration of the following description taken in conjunction with the accompanying drawings in which like elements are designated with the same reference numerals throughout the different views. The drawings are not necessarily drawn to scale, emphasis instead being placed upon illustrating the principles of this invention.

DESCRIPTION OF THE PREFERRED EMBODIMENTS

As used in this application "pasta" is defined as any of those food products which may be made by extrusion, regardless of the shape, configuration, or consistency or ingredients involved. For example, certain types of pasta may be prepared from semolina, farina, or wheat flour or a mixture of these with water or milk or with or without egg yolks or other ingredients. Noodles, for example, which may be extruded have a greater concentration of egg yolks, while green spaghetti or noodles may include spinach. At times the specification will refer to pasta mixture, dough, or alimentary paste which may have a variety of consistencies including flaky, powdery, granular, doughy, pasty, etc. The size and the shape of the extruded food items will depend on the size and the shape of the orifices in the extrusion die plate through which the pasta mixture, dough or alimentary paste are forced by pressurization produced in a pressure chamber adjacent to the extrusion die plate. These elongated strand-like shapes may include flat ribbon shapes characteristic of noodles, round solid shapes characteristic of spaghetti, combinations of round and flat shapes, such as linguinni, very thin round shapes characteristic of vermicelli, hollow elongated shapes, characteristic of macaroni.

Figure 1:
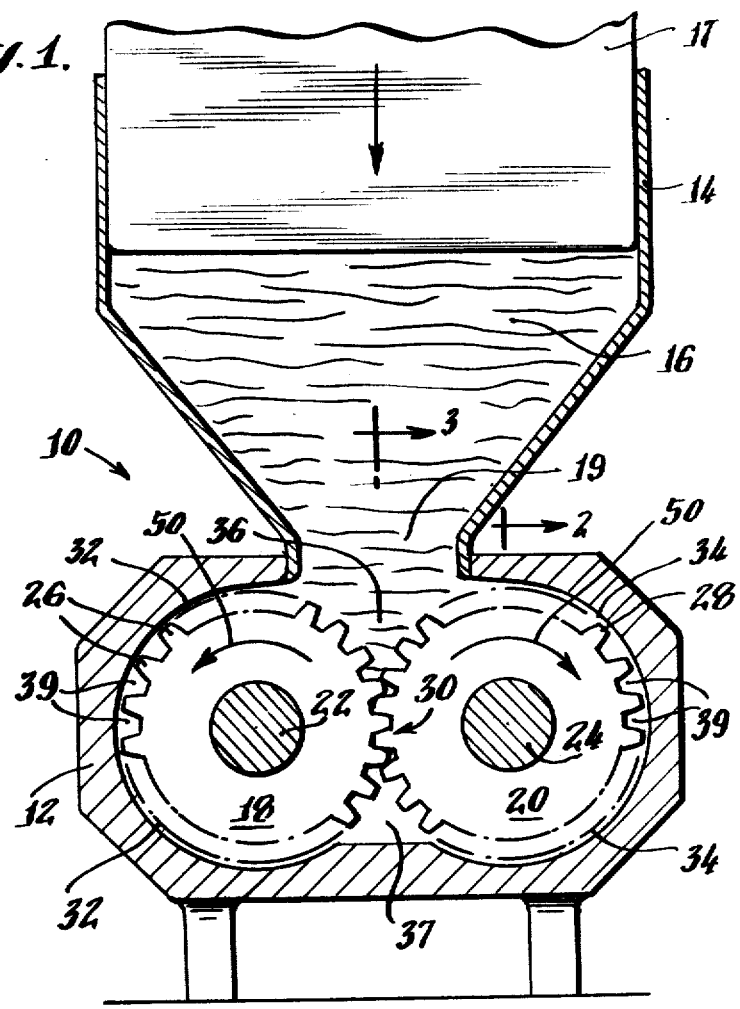
FIG. 1 is a front elevational sectional view of the pasta extruder apparatus embodying the present invention.

Referring now to FIG. 1 the pasta extruder apparatus, referred to generally with the reference number 10 includes a housing 12 which supports an in-feed hopper 14 which is adapted to feed the pasta mixture, dough or alimentary past or granules or flakes 16 with the help of gravity into the apparatus 10 for extrusion. A hand-held plunger or pusher 17 may be inserted into the hopper 14 for pushing the pasta mixture 16 down into the throat 19 of the hopper for entry into the housing 12. The ingredients of the pasta mixture 16 will correspond to the type or types of pasta which are to be extruded through the various orifices in the die plate.

A pair of gears 18 and 20 are mounted for rotation on the shafts 22 and 24, respectively, within the housing 12. The gears 18 and 20 have peripheral teeth 26 and 28 thereon, respectively, which intermesh in a meshing zone 30 between these two gears. Arcuate channels 32 and 34 are formed between the housing 12 and the peripheries of the gears 22 and 24, respectively. These channels are in communication with an input chamber 36 located near the gear teeth. This input chamber 36 is positioned under the throat of the hopper 16.

It is to be noted that the interior surfaces of the curved walls of the housing 12 in the regions of the arcuate channels 32 and 34 closely conform to the peripheries of the two gears 18 and 20 which are counter-rotating in the directions of the arrows 50. Thus, pasta mixture in the input chamber 36 which enters into the spaces 39 between the teeth of each of the gears becomes trapped in these spaces and is propelled along the two arcuate channels 32 and 34 toward a pressure chamber 37. The close-fitting curved walls of the housing along each channel 32 and 34 trap the pasta mixture 16 in the spaces 39 between the gear teeth and prevent the pasta mixture from escaping as it is being effectively and relatively efficiently propelled toward this pressure chamber 37.

Figure 2:
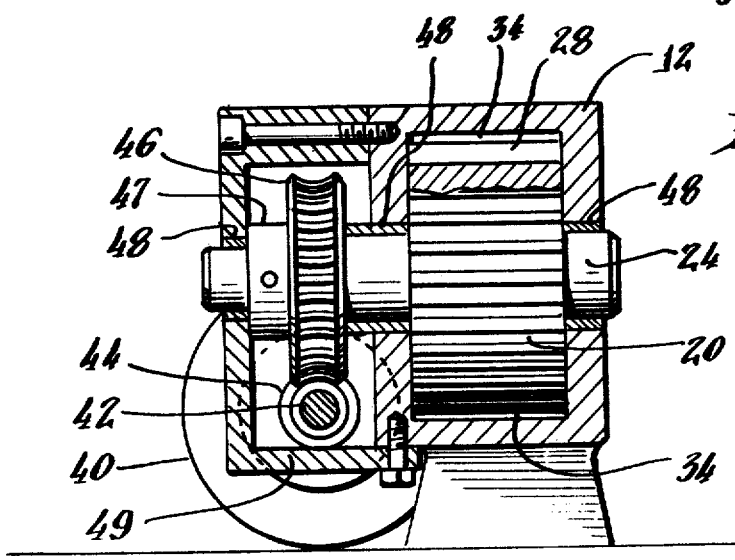
FIG. 2 is a cross sectional view taken along line 2—2 of FIG. 1.

As will be seen in FIG. 2 a motor 40 drives a rotating shaft 42 having a worm gear 44 thereon for driving a reduction gear 46 mounted on a hub 47 fixed to the shaft 24 for the gear 20. This structure constitutes the drive means for rotating gears 18 and 20 in opposite directions within the housing, as indicated by the arrows 50 in FIG. 1. Accordingly, the rotation of the shaft 42 by the motor 40 turns the worm gear 44 which in turn rotates the reduction gear 46 and the shaft 24 to which is secured the gear 20. Since the gear 20 is rotated in one direction its peripheral teeth 28 mesh with the peripheral teeth 26 of the gear 18, thereby driving the gear 18 to rotate in the opposite direction.

The worm gear reduction drive 44, 46 causes the gears 18 and 20 to rotate at a relatively slow speed with a relatively great torque, considering the compact overall size of the apparatus. For example, the gears 18 and 20 are turned at only a few revolutions per minute (RPM).

As explained above, the pasta mixture 16 is trapped in the spaces 39 between the gear teeth and is thereby effectively and relatively efficiently propelled along the channels 32 and 34 into the pressure chamber 37 from which the only exits are through the orifices in the die plate. The pasta mixture cannot pass between the two gears because the meshing zone 30 completely blocks the region between the two gears. The intermeshing teeth in the zone 30 force the pasta mixture out from the spaces 39 under pressure into the pressure chamber 37, thereby substantially uniformly pressurizing the pasta mixture throughout the pressure chamber 37 for uniformly extruding the pasta through the die orifices 56. Relatively little slippage occurs between the pasta mixture and the gear teeth 26 and 28, as distinguished from a conventional helical feed-screw-type of pasta extruder in which a relatively large amount of slippage is continuously occurring.

Moreover, the pasta mixture is advantageously being uniformly driven by pressure to extrude through the die orifices 56; whereas in a helical feed-screw pasta extruder the pasta mixture experiences a wiping or scraping action as the end of the feed-screw and its helical blade or blades revolve against the inside surface of the extrusion die located at the forward end of the tubular barrel which contains the feed-screw.

The illustrative embodiment shows a separate motor drive 40 for the pasta extruder apparatus 10. However, this apparatus may be arranged to be driven by the motor drive of a kitchen appliance such as a food processor and, accordingly, is adapted to become an attachment for mounting to a food processor.

In order to adapt the pasta extruder apparatus 10 of the present invention to a food processor, the outer end of the shaft 42 is provided with a coupling such as splined male or female members adapted to mate with a complementary splined female or male member driven by the motor of the food processor. For example, the axis of the shaft 42 may be oriented vertically with the outer end of this shaft 42 extending down through the bottom 49 of the housing 12. This shaft 42 is provided with a coupling adapted to be coupled onto to the tool drive shaft of the food processor.

It is to be understood that the speed-reducing, torque-increasing mechanism 44, 46 may be any suitable gearing arrangement for driving the shaft 24 of the gear 20 at a slow speed, for example, on the order of only a few RPM. It is to be understood that the shafts 22, 24 and 42 are provided with suitable bearings, for example as indicated at 48.

The extrusion die plate 54 may be readily removed and replaced by one having different sized and different shaped orifices 56 in order to accommodate the extruding of different sizes and shapes of pasta food articles.

Figure 3:
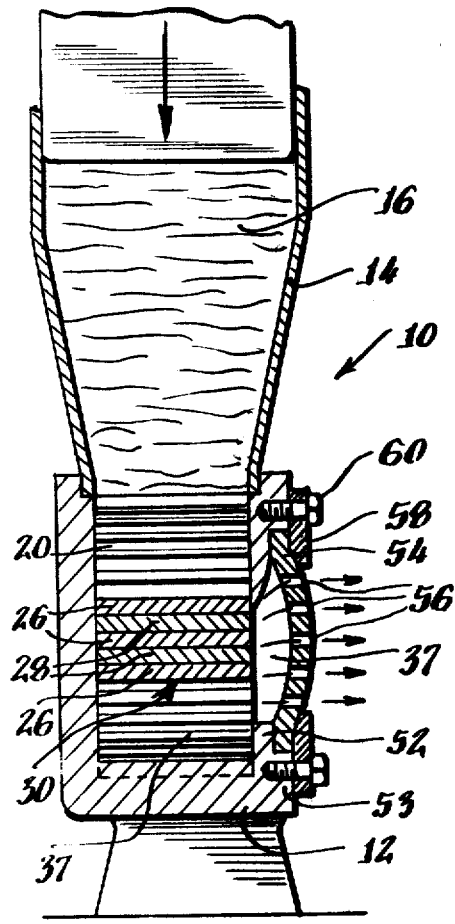
FIG. 3 is a cross sectional view taken along line 3—3 of FIG. 1.

As will be seen in FIG. 3 one side of the housing 12 includes an annular flange 53 which acts as a seat 52 for an extrusion die plate 54 having a plurality of extrusion orifices 56. The extrusion die 54 and the orifices 56 therethrough are located immediately adjacent to the pressure chamber 37. The extrusion die plate 54 is held in place by a clamp ring 58 attached to the housing 12 by suitable releasable fastening means, for example a plurality of machine screws 60. For example, different dies 54 will be utilized for thick and thin spaghettis, vermicelli, noodles, linguinni, macaroni, zitti, etc. Accordingly, one pasta extruder machine 10 can be utilized for extruding a plurality of strands and thus making large quantities of fresh pasta at the desire of the user. The pasta is fresh and tastier, because of its freshness, as well as permitting the user to control the ingredients, eliminating the undesired additives or preservatives which are often prevalent in store-bought variety pastas. The mixing and extruding of the pasta is not only fresher but may also be less expensive than the prepackaged, distributed varieties.

In operation, the pasta mixture 16 is fed by gravity or by the pusher 17 into the input chamber 36. The counter rotation of the gears 18 and 20 cause the teeth 26 and 28 to transport the pasta mixture 16 in their spaces 39 through the narrow passageways or channels 32 and 34 into the pressure chamber 37. As the teeth 26 and 28 of the gears 18 and 20 mesh in the zone 30 the pasta mixture 16 is forced under pressure into the chamber 37 and thence out through the orifices 56 of the extrusion die 54, thereby extruding strands of pasta. The confined channels 32, 34 together with the slowly rotating gears driven under a relatively large torque advantageously create a relatively great pressure in the chamber 37 for producing the desired uniform extrusion. The beauty of this arrangement resides in the compact nature of the apparatus 10 which generates a substantially uniform large pressure in the chamber 37 for causing extrusion to occur through the orifices 37 by pressure only. The gears 18 and 20 may have a short axial length of 1 inch.

Since other changes and modifications varied to fit particular operating requirements and environments will become understood by those skilled in the art, the invention is not considered limited to the examples chosen for purposes of illustration, and includes all changes and modifications which do not constitute a departure from the true spirit and scope of this invention as defined by the following claims:

What is claimed is:

1. Pasta extruder apparatus comprising a pair of gears of similar size; said gears being rotatable about respective spaced, parallel horizontal axes; said gears having peripheral teeth engaging each other in a meshing zone in a closely interfitting relationship; drive means for rotating said gears in opposite directions; a housing closely surrounding said gears having an in-feed hopper for feeding a pasta mixture into the spaces between the teeth of said two gears at a location spaced from said meshing zone for causing the teeth of said oppositely rotating gears to propel the pasta mixture toward the zone where the teeth of the two gears are meshing with each other; said housing defining a pressure chamber communicating with the peripheries of said gears immediately upstream from said meshing zone for the rotating gears to push said pasta mixture out of the respective spaces between the meshing teeth into the pressure chamber under pressure; and an extrusion die adjacent to said pressure chamber having a plurality of orifices communicating with said pressure chamber for extruding the pasta out through said orifices said die being axially adjacent said gears.

2. Pasta extruder apparatus as claimed in claim 1, in which said extrusion orifices are aimed in a direction substantially parallel with the axes of said gears for extruding said strands in an axial direction.

3. Pasta extruder apparatus as claimed in claim 1 or 2, in which said gears each have an axial length approximately 1 inch long.

4. Pasta extruder apparatus as claimed in claim 1 or 2, in which said hopper communicates with the peripheries of said two gears immediately downstream from said meshing zone for causing the pasta mixture to feed into the spaces between the teeth of said two gears soon after the teeth exit from said meshing zone.

5. Pasta extruder apparatus as claimed in claim 1 or 2, in which said extruder die is a die plate spaced away from the teeth of the two gears with a portion of the pressure chamber being positioned between the gears and the die plate for causing the pasta to be extruded from said pressure chamber through said die orifices by pressure only.

6. Pasta extruder apparatus for extruding articles of food from a pasta mixture comprising:
   a housing having a food hopper for feeding into said apparatus a pasta mixture, which is to be extruded;
   first and second gears having peripheral teeth which are adapted to closely intermesh in a meshing zone therebetween;
   said first and second gears being mounted for counter rotation in said housing with the peripheries of said gears being in communication with said hopper such that said pasta mixture is fed from said hopper into the spaces between the teeth of said first and second gears;
   drive means for rotating said first and second gears in opposite directions within said housing,
   said housing defining a pressure chamber communicating with the peripheries of said gears where the gear teeth are approaching and entering said meshing zone;
   an extrusion die having a plurality of extrusion orifices mounted in said housing adjacent to and in communication with said pressure chamber and being disposed axially of said gears; and
   said teeth of said gears propelling said pasta mixture toward said meshing zone where the meshing teeth of said first and second gears force said pasta mixture out of the spaces between said teeth under pressure into said pressure chamber for extruding pasta out through said orifices, thereby extruding pasta food items in accordance with the size and shape of said orifices.

7. The pasta extruder apparatus set forth in claim 6 in which, the periphery of said first and second gears are closely spaced from the interior surfaces of the walls of said housing forming narrow arcuate channels extending partially around said first and second gears, the upper portions of said channels being in communication with said hopper and the lower portions of channels being in communication with said meshing zone; the peripheral teeth of said gears propelling said pasta mixture through said arcuate channels toward said meshing zone, where the pasta mixture is forced out of the spaces between said teeth under pressure into said pressure chamber.

8. The pasta extruder apparatus set forth in claim 6 or 7 in which said housing is closed on the side of said first and second gears in an axial direction opposite to said extrusion die.

9. The pasta extruder apparatus set forth in claim 6 or 7 in which said first and second gears have an axial length of approximately one inch.

10. The pasta extruder apparatus set forth in claim 6 or 7 in which said axes of said first and second gears are parallel horizontal axes, and said extrusion orifices are oriented in a direction substantially parallel therewith for extruding strands of pasta in a substantially horizontal direction through said orifices.

* * * * *